United States Patent
Yarlagadda et al.

(10) Patent No.: US 7,634,072 B2
(45) Date of Patent: Dec. 15, 2009

(54) INTEGRATED INSTANT MESSAGING, ROUTING AND TELEPHONE SERVICES BILLING SYSTEM

(75) Inventors: Madhu Yarlagadda, Los Altos Hills, CA (US); Warren Wan, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 956 days.

(21) Appl. No.: 11/056,212

(22) Filed: Feb. 10, 2005

(65) Prior Publication Data

US 2005/0259798 A1    Nov. 24, 2005

Related U.S. Application Data

(60) Provisional application No. 60/544,880, filed on Feb. 13, 2004, provisional application No. 60/544,914, filed on Feb. 13, 2004.

(51) Int. Cl.
- H04M 1/56 (2006.01)
- H04M 15/06 (2006.01)
- H04M 1/64 (2006.01)

(52) U.S. Cl. ............................ 379/142.01; 379/88.22; 379/126

(58) Field of Classification Search ............ 379/142.01, 379/88.13, 88.17, 88.22, 88.28, 126, 133; 455/412.01, 414.1; 709/204, 206
See application file for complete search history.

(56) References Cited

U.S. PATENT DOCUMENTS

| | | | |
|---|---|---|---|
| 5,758,088 A | 5/1998 | Bezaire et al. | |
| 5,966,714 A * | 10/1999 | Huang et al. | 707/201 |
| 6,021,433 A | 2/2000 | Payne et al. | |
| 6,167,426 A | 12/2000 | Payne et al. | |
| 6,735,614 B1 | 5/2004 | Payne et al. | |
| 6,738,462 B1 * | 5/2004 | Brunson | 379/142.06 |
| 6,853,713 B1 * | 2/2005 | Fobert et al. | 379/142.17 |
| 7,039,177 B1 * | 5/2006 | Smith et al. | 379/355.03 |
| 2005/0044152 A1 * | 2/2005 | Hardy et al. | 709/206 |

* cited by examiner

Primary Examiner—Quoc D Tran
(74) Attorney, Agent, or Firm—Darby & Darby P.C.; Scott M. Tobias

(57) ABSTRACT

Techniques for using billing services to manage a personal address book are provided. The techniques comprise receiving a call detail record (CDR) for a plain old telephone system (POTS) or a voice-over-IP (VOIP) call by a user. The CDR is created by a telecommunication carrier that routed the call. The CDR may be stored on a telecommunications server associated with the telecommunications carrier. Address information for the call is determined from the CDR. This address information is added to the personal address book for the user. This address information may be available for the user when using an IM client.

20 Claims, 3 Drawing Sheets

INTEGRATED INSTANT MESSAGING, ROUTING AND TELEPHONE SERVICES BILLING SYSTEM

CROSS-REFERENCES TO RELATED APPLICATIONS

This application claims the benefit of the filing date of U.S. Provisional Patent Application No. 60/544,914 filed Feb. 13, 2004 and U.S. Provisional Patent Application No. 60/544,880 filed Feb. 13, 2004, both of which are incorporated by reference in their entirety for all purposes.

This application is related to U.S. application Ser. No. 11/056,485, entitled "PREDICTIVE COMMUNICATION ROUTING SCHEME USING INSTANT MESSAGING PREFERENCES AND/OR SETTINGS FOR ROUTING PACKET TRAFFIC FOR VOICE, VIDEO OR OTHER MULTIMEDIA COMMUNICATIONS", filed concurrently, and hereby incorporated by reference for all purposes.

BACKGROUND OF THE INVENTION

The present invention generally relates to communications and more specifically to using billing services to populate a personal address book.

Typically, when a message is received, a user will write down a number for the person who called in order to call him/her back. The user will then end the call and make a new call using the number. Some time after this (e.g., a month later), the user may want to make another call to the same person. However, the user may have thrown away the number that was written down. In order to find the number, the user may have to manually look up the number using the white pages, search through their records, etc.

In some cases, the user can manually enter the number into an address book for later use. However, this involves manual steps and, in addition, the user may not have all the information that may be convenient to include in the address book, such as a full name, address, etc. Accordingly, the user may have to look up additional information for the recipient. Manually inputting the information may also be inconvenient for the user. For example, a user may not have time to manually input the addresses and contact information for all the calls that the user has made. This may be especially true if the address book is being maintained for a business that has a lot of contacts and makes a lot of calls. Additionally, if the information is not inputted, it is inconvenient for the user to manually look up a person's contact information at a later time.

BRIEF SUMMARY OF THE INVENTION

Embodiments of the present invention generally relate to techniques for using billing services to manage a personal address book. In one embodiment, the techniques comprise receiving a call detail record (CDR) for a plain old telephone system (POTS) call or a voice-over-IP (VOIP) call by a user. The CDR is created by a telecommunication carrier that routed the call. The CDR may be stored on a telecommunications server associated with the telecommunications carrier.

Address information for the call is determined from the CDR. This address information is added to the personal address book (PAB) for the user. In one embodiment, this address information may be available for the user when using an IM client.

In one embodiment, a method for updating address book information is provided. The method comprises: retrieving a call detail record (CDR) for a call by a user, the CDR created by a telecommunications carrier; determining address information for the call; and adding the address information in a personal address book for the user, the address information available for the user when using an IM client.

In another embodiment, a method for updating address book information is provided. The method comprises: retrieving one or more call detail records (CDRs) for one or more plain old telephone system (POTS) calls made by a user, the CDRs created by a telecommunications carrier that routed the call; determining address information for the one or more calls; and adding the address information in a personal address book for the user, the address information available for the user when using an IM client.

In another embodiment, a system for managing an address book is provided. The system comprises: a PSTN telecommunications device configured to create call detail records (CDRs) for calls made from/received for a number; an IM server configured to access the CDRS and further comprising logic to: determine address information for the call; and add the address information in a personal address book for the user, the address information available for the user when using an IM client.

A further understanding of the nature and the advantages of the inventions disclosed herein may be realized by reference of the remaining portions of the specification and the attached drawings.

DETAILED DESCRIPTION OF THE INVENTION

Figure 1:
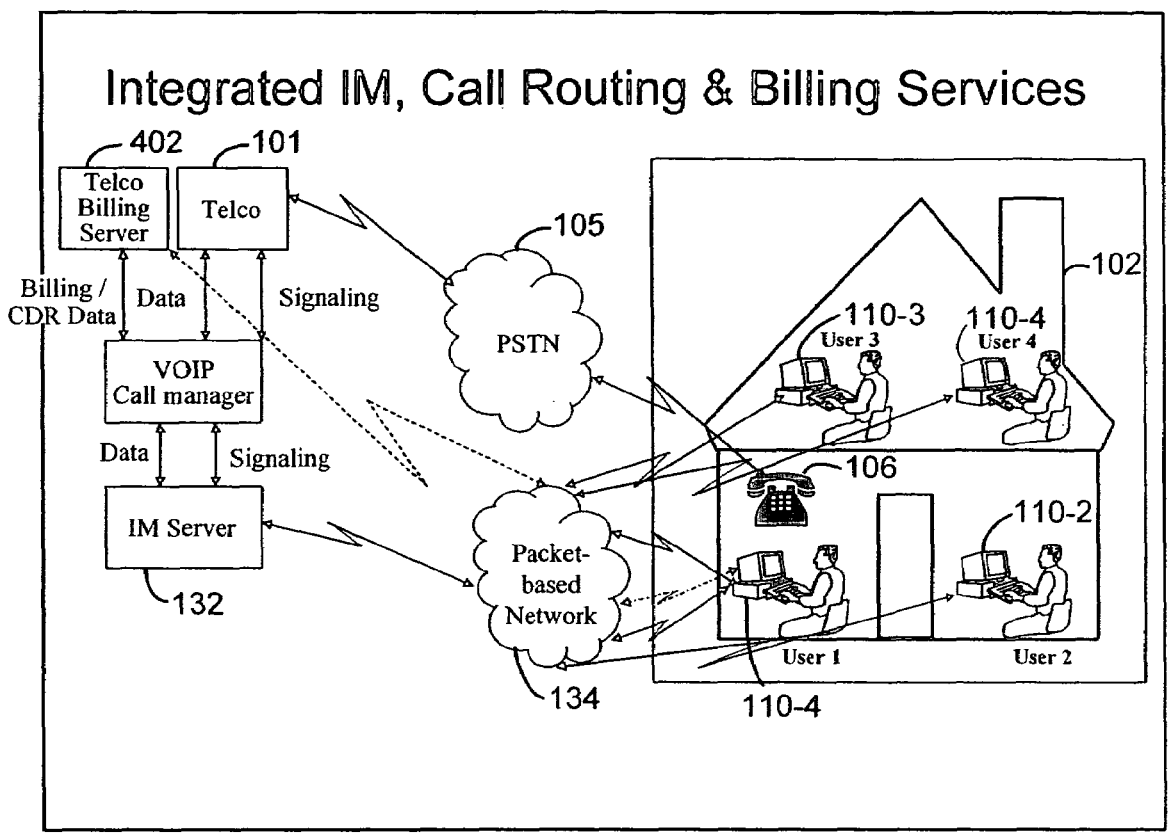
FIG. 1 depicts a system for processing plain old telephone service (POTS) or voice-over-IP (VOIP) calls according to one embodiment of the present invention.

FIG. 1 depicts a system 400 for processing plain old telephone service (POTS) or voice-over-IP (VOIP) calls according to one embodiment of the present invention. In one embodiment, calls that may be routed may be voice calls, video calls, multimedia communications and other communications. For example, voice calls may be routed through a PSTN (public switched telephone network) 105 or a packet-based network 134. Although voice calls will be described, it will be recognized that embodiments of the present invention can route other types of data traffic.

Telco 101 may be any telecommunications device. For example, telco 101 may be any system capable of routing PSTN voice calls. Examples of telco 101 include systems operated by competitive local exchange carriers (CLEC), incumbent local exchange carriers (ILEC), etc., and may include switches, monitors, etc.

As shown there, a telco system 101 is coupled to handle voice lines from a voice trunk. When a call is to be routed to location 102, telco system 101 (such as a switch) signals over telephone line 104. If telephone 106 is on-hook (i.e., not in use), the signal triggers a ring and the call can be completed from telco system 100 to handset 106. Other devices might be present on telephone line 104, such as a computer 110 that is coupled to the line via a modem 112.

Location 102 may be any location that includes telephone 106 and/or computing device 110. For example, location 102 may be a home, office location, etc. In one embodiment, location 102 may be a location that is associated with a telephone number. For example, a location 102 may be a home in which phone calls for a telephone number are routed by telco 102. Location 102 may be associated with many devices that can receive voice calls. For example, telephone 106, computing device 110, and other devices are provided in location 102.

Telephone 106 may be any device capable of receiving voice calls. For example, telephone 106 may be any PSTN devices. For example, telephone 106 may be a landline phone, wireless phone, cordless phone, personal digital assistant (PDA), etc.

Computing device 110 may be any computing device configured to receive voice calls. In one embodiment, computing device 110 may include an IM client that can receive instant message communications in addition to voice calls. Computing device 110 may include a computer, personal digital assistant (PDA), workstation, laptop computer, personal computer, etc.

Other devices (not shown) may be any other devices that can receive voice calls.

In one embodiment, computing device 110 is configured to receive VOIP calls. Although computing device 110 is shown in location 102, it will be recognized that computing device 110 may be remotely located from location 102. For example, a user may use an IM client on computing device 110 to receive calls from a remote location. Thus, a user may have a username that is associated with location 102. That user may log on to an IM client at any location and receive calls for a telephone number associated with location 102.

Calls may be received through PSTN network 105 or packet-based network 134. PSTN network 105 is configured to send voice calls over a plain old telephone system (POTS) or public switched telephone networks (PSTNs). IM server 132 is configured to send voice calls over a packet-based network. A packet-based network 134 may include an IP (Internet protocol) network, asynchronous transfer mode (ATM) network, frame relay network, wireless network, etc.

Voice over Internet Protocol (VOIP) manager 130 is configured to receive signaling from telco 101. For example, a call may be received by telco 101. Telco 101 may be configured to send the voice call to telephone 106 through PSTN network 105. Additionally, telco 101 has the option to send the call to an IM client running on computing device 110 through VOIP manager 130, IM server 132, and packet-based network 134. In this case, the voice call may be routed to VOIP manager 130. VOIP manager 130 is then configured to determine an IM server 132 that can deliver the voice call to the IM client at computing device 110. Different IM servers 132 may be configured to deliver information to IM clients at location 102. Traffic server 130 determines an appropriate IM server 132 and sends the voice call to IM server 132.

IM server 132 is then configured to send the voice call to an IM client associated with location 102 through packet-based network 134. IM server 132 is configured to provide IM-related services to IM clients on computing devices 110. For example, IM clients may conduct IM conversations with other IM clients through IM server 132. In general, IM clients are associated with usernames. The usernames are identifiers for various users. For example, the IM usernames may be a login ID such as a Yahoo! IM identifier, etc. The IM username may be associated with a location 102. For example, if a family lives at location 102, IM usernames for every member of the family may be associated with location 102. IM server 132 may communicate with each IM username associated with location 102.

In one embodiment, IM server 132 may send voice calls received from traffic server 130 to IM usernames. IM server 132 may be configured to ring IM usernames when a telephone call is received for a telephone number. For example, IM usernames may be associated with a telephone number for location 102. When a voice call is received for that telephone number, IM server 132 may be contacted with an indication that a voice call has been received for that telephone number. IM server 132 may then detect which IM usernames are online and then ring the IM clients that are online.

Accordingly, presence information may be used to determine which IM clients are online. In one embodiment, the presence information may indicate that an IM client is offline or online. There may also be various statuses, such as busy, away, etc. IM server 132 may be configured to ring an IM client based on the status, such as an IM may be rung if a status is "away" but not rung if the status is "busy".

The voice calls may be routed through a router at location 102. The router may route the calls to telephone 106, computing device 110, or other devices. The network connection at location 102 may be a dial-up line, broadband, such as via a DSL filter, or router, etc. Also, as mentioned above, the usernames may be logged on IM clients remote from location 102. These calls may be routed appropriately and may not go through location 102.

A voice call is thus routed from an IM server 132 through packet-based network 134 to IM clients on computing devices 110 when a call is received for a telephone number. Various scenarios of how voice calls are routed to telephone 106 and IM clients at location 102 will not be discussed.

Multiple users, users 1-4, may also use IM clients on computing devices 110 in order to make calls. Users 1-4 may be associated with location 102. For example, a user may be associated with a number for location 102, such as a PSTN number for PSTN phone 106 or a username. Although users 1-4 are shown in the same location, it will be understood that users 1-4 may be remotely located from location 102. For example, they may be mobile but may have access to an IM client.

When calls are routed by a telco 101, a call detail record (CDR) is created. This record may include the time the call was made, phone number to where the call was made, and the duration of the call. This information may be stored in a telco billing server 402. This information may be used by telco 101 for billing clients.

Embodiments of the present invention allow a VOIP call manager to retrieve the CDR information from the telco 101 billing server 402. Address information is then determined and is used to populate a personal address book for a user. An IM client can be used to send a command to populate the PAB.

In one embodiment, user 1 may call a user. For example, user 1 may call a PSTN destination number using the user's IM client. The IM client performs the required signaling with IM server 132. IM server 132 may then contact the VOIP call manager 130, which can then connect a PSTN call from a computing device 110 of user 1 to the PSTN number. In one embodiment, a session initiation protocol (SIP) and real-time transport protocol (RTP) data stream may be used to transfer voice data. It will be understood that other types of signaling data stream protocols may be used.

In another embodiment, user 2 may call another IM user using user 2's IM client. The other user's IM client rings and user 2 will hear a ring back tone. If the other user accepts the call, then both of them may be able to talk to their IM clients. In one embodiment, signaling is performed through packet-based network 134 using SIP and RTP. It is also possible the RTP data may be sent between user 2 and the other user using peer-to-peer (PTP) techniques.

If an incoming call comes in for the PSTN number associated with telephone 106, IM clients for all four users may ring in addition to telephone 106. Each of the IM clients may do a personal address book lookup for the caller ID. If a match is found, the caller name from the personal address book is displayed on the IM clients for the users. If one of the users picks up the call, user is connected to the call through either the IM client or telephone 106. The ringing on the other IM clients and telephone 106 may be suppressed.

It is also possible to make a PSTN call using telephone 106. This call goes through PSTN 105 through telco 101. Telco 101 may then route the call to another user. For example, the call may go to a PSTN number or it may go to a VOIP call manager, IM server 132 to a computing device 110.

When a PSTN call is made from/received at the PSTN line or a VOIP call is made from an IM client, telco 101 may create a call detail record (CDR). When a VOIP call is made through packet-based network 134, IM server 132 and VOIP call manager may communicate with telco billing server 402 in order to have a CDR created for that call. This communication may be necessary because the call may not go through telco 101 because it is a VOIP call between two IM clients connected to packet-based network 134.

With integrated billing, VoIP calls can be billed onto a telephone bill. Registration might be used to map IM IDs to phone numbers for billing purposes. With known associations between IM IDs and phone numbers, services such as automatic routing of calls to an IM client instead of a voice line can be performed. Thus, a user could log into an IM service and make calls, with the calls being automatically billed on the user's telephone bill as CDRs, at the same or different rate than for other calls. Services such as Internet call waiting, IM extended services and other subscription of pay-per-service services could be billed to the telephone bill as CDRs also.

Figure 2:
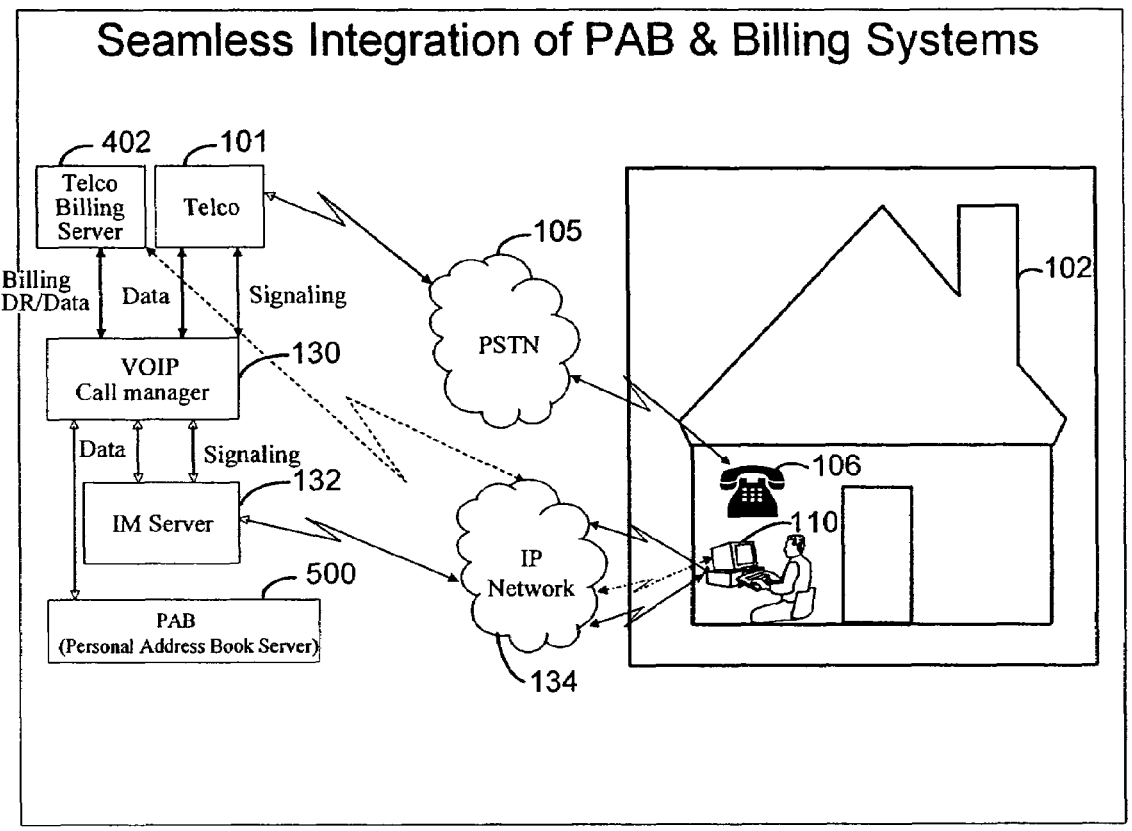
FIG. 2 depicts a more detailed embodiment of the system showing how billing information is used in order to populate a personal address book according to one embodiment of the present invention.

FIG. 2 depicts a more detailed embodiment of a system 400 showing how billing information is used in order to populate a personal address book according to one embodiment of the present invention. In one embodiment, the VOIP call manager may query telco billing server 402 for call detail records (CDRs).

The CDRs includes records for all calls made by/received for a user (or location 102). Some of or all of the calls in the CDRs may be processed. In one embodiment, location 102 may have multiple lines that send/receive calls. The CDRs for multiple lines may be retrieved in this case. Also, multiple users may make/receive calls for location 102; CDRs for all of these calls may also be retrieved. The CDRs may then be collated. For example, the calls may be sorted by a phone number or by chronological order.

For each call, address information for the CDRs is determined. It is then determined if the address information is found in the user's personal address book. If the address information is not, the VOIP call manager may store the address information in the user's PAB.

In one embodiment, it is possible to access the CDR records from the server side or client side. For example, VOIP call manager 130 may access telco billing server 402 in order to access the CDR records. Also, an IM client of computing device 110 may access telco billing server 402 through packet-based network 134.

The PAB may be stored on the server side or client side. For example, the PAB may be stored on PAB server 502 remotely located from location 102. An IM client may then access the PAB through packet-based network 134.

Additionally, the PAB may be stored on the client side on computing device 110. In another embodiment, the PAB may be stored on the server side and information from the PAB is cached on computing device 110 for a quicker access to the address information.

Figure 3:
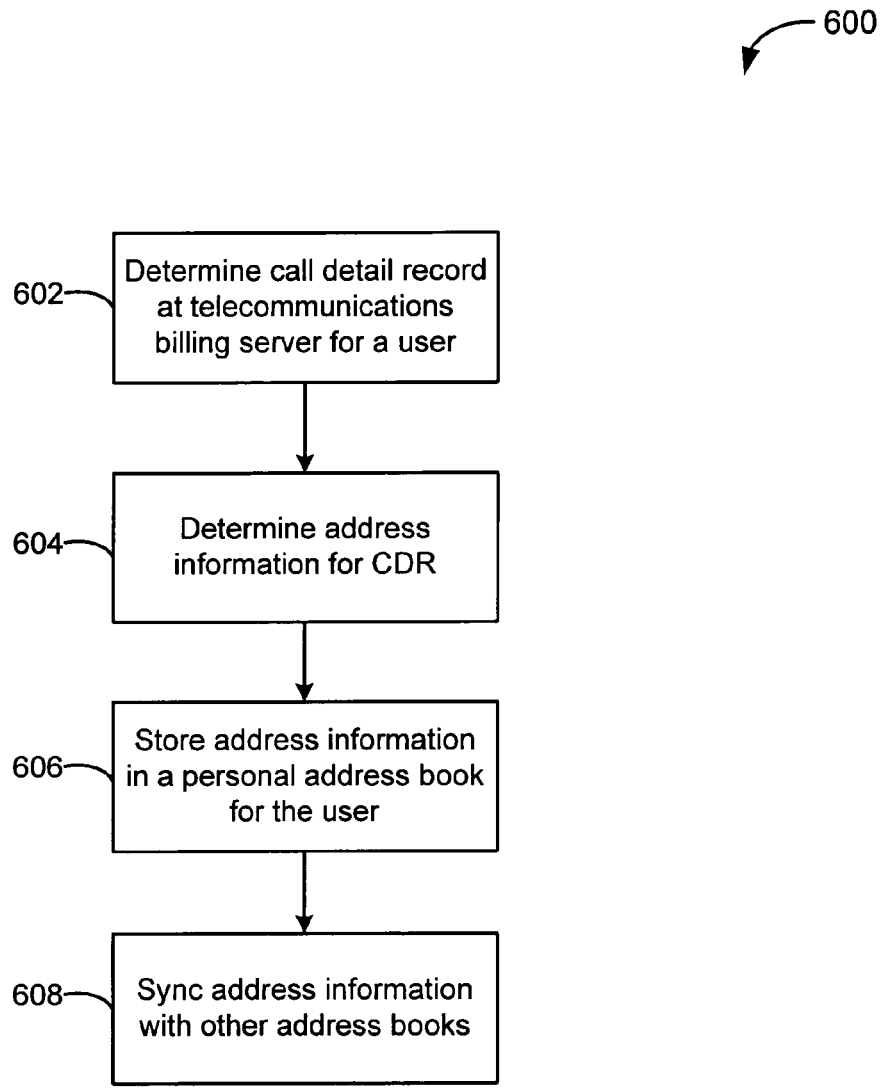
FIG. 3 depicts a simplified flowchart of a method for managing a personal address book for a user according to one embodiment of the present invention.

FIG. 3 depicts a simplified flowchart 600 of a method for managing a personal address book for a user according to one embodiment of the present invention. In step 602, a call detail record is determined at telecommunications billing server 402 for a user. This may be initiated by VOIP call manager or by an IM client being used by a user. Conventionally, access to CDRs was restricted by telco 101. However, through agreements with telco 101, VOIP call manager 130 or the IM client is able to access the CDRs. The IM client may indicate that address information for all calls made/received by a phone number should be populated in the address book. For example, the IM client can request that address information for calls made in the last 60 days should be added to the PAB.

In step 604, address information for the CDR is determined. For example, the user's name, phone number, and residence address may be determined from the CDR. Also, the time the call is made and other information may be determined. If the address information is not found in the CDR, then a white page lookup may be performed for the information. This information is sufficient for the user to be able to contact the recipient.

In step 606, address information is stored in a personal address book for the user. The personal address book may be located on the server side or client side. For example, PAB may be stored in PAB server 502. The IM client for the user may then be used to access address information on PAB server 502. Additionally, PAB may be stored on the client side on computing device 110.

In step 608, the address information stored in the PAB is synced with other address books that may be associated with a user. For example, a user may maintain address books other than the PAB, such as an address book for Outlook®, an address book in a wireless cell phone, an address book for a PSTN phone, a personal digital assistant (PDA) address book, etc. The PAB may be synced with the other address books.

Accordingly, embodiments of the present invention allow a user to access call detail records on a telecommunications billing server 402. Thus, when a call is made to user, if the user is not in a personal address book, then that user's information may be added to the PAB. Thus, manual lookups for the call recipient are not necessary. This saves time for the user and eliminates manual steps. Additionally, an IM client can be used to request that address information be added to a PAB. Also, the PAB can be accessed using the IM client. This is valuable because of calls are now increasingly being made using IM clients. Access to the PAB through the IM client makes making calls easier.

FURTHER EMBODIMENTS

While the invention has been described with respect to specific embodiments, one skilled in the art will recognize that numerous modifications are possible.

The embodiments described herein may make reference to web sites, links, and other terminology specific to instances of communications systems. It should be understood that the systems and processes described herein can be adapted for use with a different data transport technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for updating address book information in an address book for an IM client, the method comprising:
    employing the IM client to determine if additional address information is available from a telecommunications carrier that corresponds to a call of a user of the address book;
    receiving a signal from an IM client indicating that the address book for the IM client is to be updated with additional address information;
    retrieving a call detail record (CDR) for a call by a user, the CDR being created by the telecommunications carrier;
    determining additional address information for the call based on the CDR; and
    adding the additional address information to the address book for the user, the additional address information being subsequently available for the user when using the IM client.

2. The method of claim 1, further comprising:
    receiving a POTs call from the user; and
    creating the CDR for the POTS call.

3. The method of claim 1, further comprising:
    receiving a VOIP call from the IM client; and
    creating the CDR for the VOIP call.

4. The method of claim 1, further comprising:
    accessing the CDR using a VOIP call manager; and
    sending the CDR to an IM server, wherein the IM server adds the address information in the address book.

5. The method of claim 1, wherein the address book is automatically updated.

6. The method of claim 1, wherein the address information in the address book is synched with a second address book for the user.

7. The method of claim 1, wherein the address book is located on a server side.

8. The method of claim 7, wherein at least part of the address book is cached at a client side.

9. The method of claim 1, wherein the address book is located on a client side.

10. A method for updating address book information, the method comprising:
    employing an IM client to determine if additional address information is available from a telecommunications carrier that corresponds to a call of a user of an address book;
    retrieving one or more call detail records (CDRs) for one or more plain old telephone system (POTS) calls made by a user, the CDRs being created by a telecommunications carrier that routed the calls;
    determining additional address information for the one or more calls based on the CDRs; and
    adding the additional address information to the address book for the user, the address information being subsequently available for the user when using an IM client.

11. The method of claim 10, wherein the personal address book is automatically updated.

12. The method of claim 10, wherein the one or more call detail records are for a certain number of calls made during a period of time.

13. The method of claim 10, wherein the address information in the address book is synched with a second address book for the user.

14. The method of claim 10, wherein the address book is located on a server side.

15. The method of claim 14, wherein at least part of the address book is cached at a client side.

16. The method of claim 10, wherein the address book is located on a client side.

17. A system for managing an address book, the system comprising:
    a PSTN telecommunications device of a telecommunications carrier configured to create call detail records (CDRs) for calls made from or received for a number of a user of the address book;
    an IM server configured to access the CDRs and further comprising logic to:
        determine if additional address information is available from the telecommunications carrier that corresponds to the calls of the user;
        determine additional address information for the calls based on the CDRs; and
        add the additional address information to the address book for the user, the additional address information being subsequently available for the user when using an IM client.

18. The system of claim 17, further comprising:
    the IM client, wherein the IM client is associated with the number, and a PSTN telephone receiving calls for and making calls from the number.

19. The system of claim 17, further comprising a PSTN telephone associated with the number, the PSTN telephone receiving calls and making calls from the number.

20. An information storage medium storing instructions to direct an information processing device to perform steps for updating address book information in an address book for an IM client, comprising:
    employing the IM client to determine if additional address information is available from a telecommunications carrier that corresponds to one or more calls of a user of the address book;
    receiving a signal from the IM client indicating that the address book for the IM client is to be updated with additional address information;
    retrieving one or more call detail records (CDRs) for the one or more calls by the user, the CDRs being created by the telecommunications carrier;
    determining additional address information for the one or more calls based on the one or more CDRs; and
    adding the additional address information to the address book for the user, the additional address information being subsequently available for the user when using the IM client.

* * * * *

UNITED STATES PATENT AND TRADEMARK OFFICE
CERTIFICATE OF CORRECTION

| | | |
|---|---|---|
| PATENT NO. | : 7,634,072 B2 | Page 1 of 1 |
| APPLICATION NO. | : 11/056212 | |
| DATED | : December 15, 2009 | |
| INVENTOR(S) | : Madhu Yarlagadda et al. | |

It is certified that error appears in the above-identified patent and that said Letters Patent is hereby corrected as shown below:

In column 1, line 14, delete "entitled"PREDICTIVE" and insert -- entitled "PREDICTIVE --, therefor.

In column 5, line 29, delete "VoIP" and insert -- VOIP --, therefor.

In column 7, line 22, in claim 1, delete "an" and insert -- the --, therefor.

In column 7, line 25, in claim 1, delete "a call by a" and insert -- the call by the --, therefor.

In column 7, line 35, in claim 2, delete "POTs" and insert -- POTS --, therefor.

In column 7, line 63, in claim 10, before "user," delete "a" and insert -- the --, therefor.

In column 7, line 63, in claim 10, after "by" delete "a" and insert -- the --, therefor.

In column 8, line 6, in claim 11, after "the" delete "personal".

In column 8, line 43, in claim 19, after "receiving calls" insert -- for --.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,634,072 B2
APPLICATION NO. : 11/056212
DATED : December 15, 2009
INVENTOR(S) : Yarlagadda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1297 days.

Signed and Sealed this

Ninth Day of November, 2010

David J. Kappos
*Director of the United States Patent and Trademark Office*